United States Patent [19]

Weber

[11] Patent Number: 4,581,909

[45] Date of Patent: Apr. 15, 1986

[54] CYLINDER LOCK, PARTICULARLY A STEERING-WHEEL LOCK FOR A MOTOR VEHICLE

[75] Inventor: Günter Weber, Wuppertal, Fed. Rep. of Germany

[73] Assignee: Neiman S.A., Courbevoie, France

[21] Appl. No.: 589,083

[22] PCT Filed: May 21, 1983

[86] PCT No.: PCT/EP83/00143

§ 371 Date: Jan. 25, 1984

§ 102(e) Date: Jan. 25, 1984

[87] PCT Pub. No.: WO83/04228

PCT Pub. Date: Dec. 8, 1983

[30] Foreign Application Priority Data

May 27, 1982 [DE] Fed. Rep. of Germany ....... 3219944
Nov. 18, 1982 [DE] Fed. Rep. of Germany ....... 3242534

[51] Int. Cl.$^4$ .............................................. B60R 25/02
[52] U.S. Cl. .......................................... 70/186; 70/252
[58] Field of Search ................... 70/252, 360, 182–186

[56] References Cited

U.S. PATENT DOCUMENTS 3,686,906 8/1972 Watkins ................................ 70/360
3,724,244 4/1973 Schaumburg ........................ 70/360
4,266,414 5/1981 Eichemauer .......................... 70/252

FOREIGN PATENT DOCUMENTS 1293049 4/1969 Fed. Rep. of Germany .
2059215 6/1972 Fed. Rep. of Germany .
2238560 2/1974 Fed. Rep. of Germany .
2133734 2/1974 Fed. Rep. of Germany .
1296972 11/1972 United Kingdom .

Primary Examiner—Robert L. Wolfe
Attorney, Agent, or Firm—Karl F. Ross; Herbert Dubno

[57] ABSTRACT

The invention relates to a cylinder lock, particularly a steering-wheel lock for a motor vehicle, comprising at least one locking member which is adapted to be operated by a cylinder core and to be moved, directly or with the aid of a transmission member, by an eccentric, adapted to be operated by the cylinder core, into the non-locking position and is held there by a locking disc which is disposed at right angles to the axis of the lock and can be released only by the withdrawal of the key. The locking disc is movable in the direction of the axis of the lock, and in a first axial position lies outside the range of movement of the locking member or transmission member and in a second axial position lies within this range of movement.

8 Claims, 15 Drawing Figures

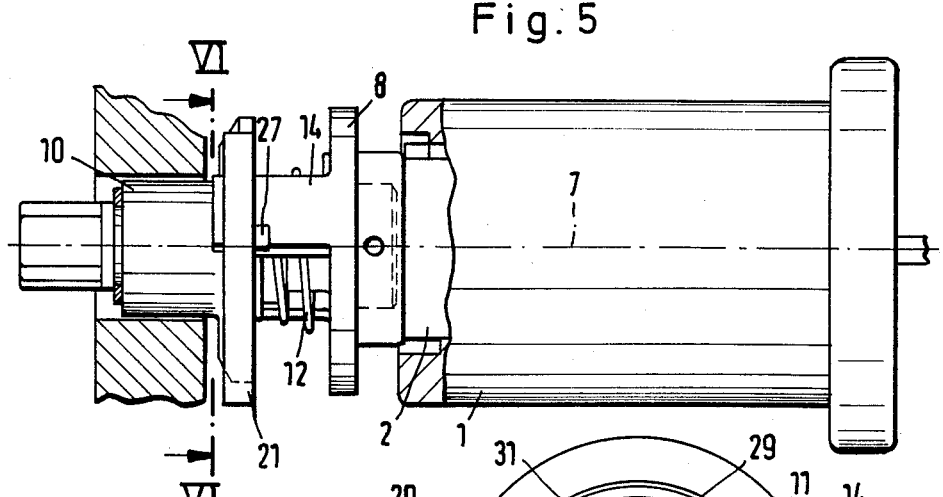
Fig. 5
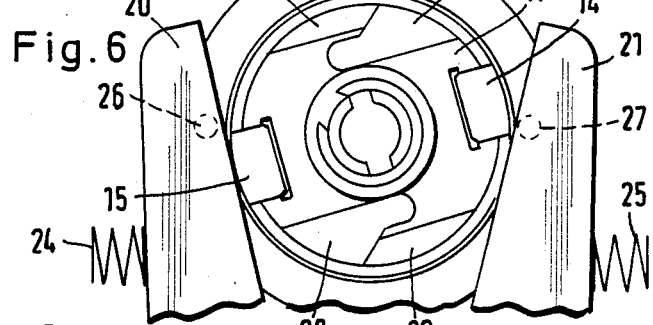
Fig. 6
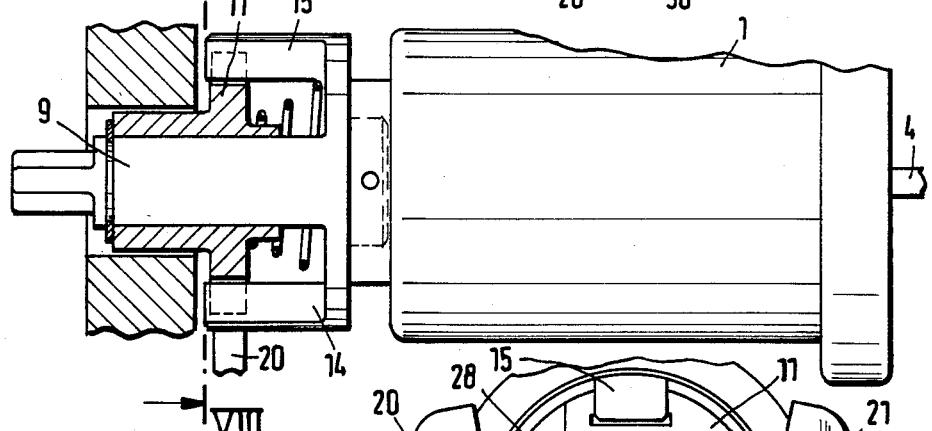
Fig. 7
Fig. 8
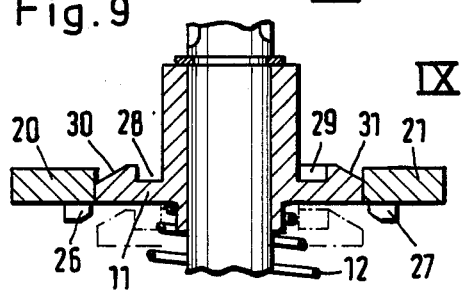
Fig. 9

Fig.14
Fig.15
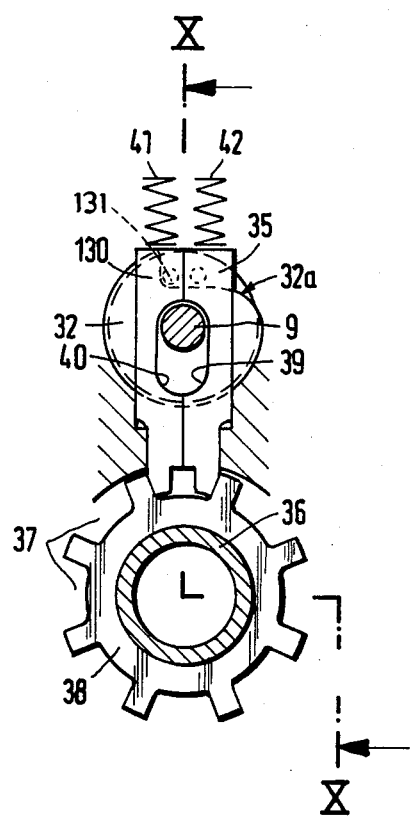
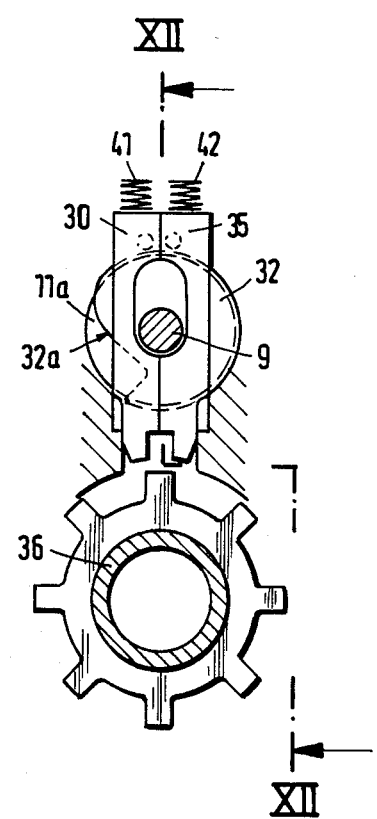

CYLINDER LOCK, PARTICULARLY A STEERING-WHEEL LOCK FOR A MOTOR VEHICLE

CROSS REFERENCE TO RELATED APPLICATIONS

This application is a national phase application corresponding to PCT/EP83/00143, filed 21 May 1983 and based upon German applications of 27 May 1982 and 18 Nov. 1982 under the International Convention.

FIELD OF THE INVENTION

The invention relates to a cylinder lock, particularly a steering-wheel lock for a motor vehicle in which a locking bolt is adapted to be operated by a cylinder core and to be moved by an eccentric into a non-locking position and to be held there by a locking disc which is disposed at a right angle to the axis of the lock and which can be released only by the withdrawal of the key.

BACKGROUND OF THE INVENTION

A lock of this kind is known from German Pat. No. 12 93 049. In this lock, the locking bolt is moved into the unlocked position by an eccentric fastened on the cylinder core, and then is held by a locking disc which is articulated about an axis offset parallel to the axis of the cylinder and is secured against pivoting by the tip of the key. After the key has been slightly withdrawn, the locking disc yields rockingly, so that the locking bolt can assume its locking position. This lock therefore locks after the key has been slightly withdrawn and, because of its construction, it has large dimensions. Moreover, it is easily manipulated from the outside, because the plate can be tilted by an object inserted through the key channel, so that the interior of the lock can be reached. Tiltability of the locking disc is necessary because the disc must yield rockingly to the tip of the key if the cutout provided in the plate for the tip of the key does not lie on the same level as the key channel.

A similar locking disc is also known from German patent document (Auslegeschrift) No. 20 59 215. This known locking disc also yields rotatingly to the locking bolt and is controlled by a two-armed lever guided parallel to the cylinder core, to which lever the locking disc yields tiltingly so that the lever can engage in the edge of the locking disc. In both known locks the tilting movement of the locking disc is necessary only to enable the member controlling or holding the disc to engage in the latter. Both known arrangements are expensive to construct and, in addition to a rotary movement, require a complicated tilting movement which is difficult to control. In addition, in the open position they do not hold the locking bolt sufficiently securely against the pressure of a spring loading the locking bolt, since the locking disc must be mounted for rotation in two directions. Moreover, this locking disc cannot operate more than one locking bolt.

OBJECTS OF THE INVENTION

The object of the invention is to provide an improved cylinder lock of the kind first mentioned above in such a manner that, while it is highly reliable in operation and releases only after the key has been completely withdrawn, it is of simple design, small in size and its locking disc is very resistant in opposing the pressure of the locking bolt. In addition, it is an object of the invention to provide a lock of the type mentioned above in which the locking disc can control more than one locking member.

SUMMARY OF THE INVENTION

According to the invention, these problems are solved in that the locking disc is movable in the direction of the axis of the lock and lies, in a first axial position, outside the range of movement of the locking member or of the transmission member and, in a second axial position, within this range of movement.

A locking disc of this kind, which is axially movable on a projection of the cylinder core, that is to say displaceable parallel to itself, and which is at right angles to the axis of the lock, can be mounted very securely and need only make a sliding movement in relation to the cylinder core. On the other hand, this disc does not need to turn relative to the cylinder core, but is turned by the latter. The "ready-to-lock position" of the locking or transmission member or members is not cancelled by a tilting or turning of the locking disc, but solely by a movement of the latter in the axial direction. The movement processes are thus very simple and very reliable.

A locking disc of this kind can absorb strong forces through the locking or transmission members and cannot be released by vibration. Moreover, small outer dimensions can be achieved, and more than one locking or transmission member can lie against the edge of the locking disc; this edge can be given a regular, particularly a circular shape.

It is preferably proposed that the locking disc should be adapted to be moved into the two axial positions by the axially movable cylinder core. It is thus possible to fasten on the locking disc a cylinder core which moves itself and the locking disc axially out of the ready-to-lock position only after the key has been completely withdrawn. In addition, the locking disc should be capable of parallel movement from the first axial position to the second.

It is particularly advantageous for the eccentric or eccentrics to lie in a cutout in the locking disc. The locking disc is thus given additional guidance for the axial movement. Alternatively, however, the eccentrics projecting only slightly over the edge of the locking disc may form a part of the locking disc, and in particular may be integrally formed on it. It is further proposed that the locking member or the transmission member should be pivotable about an axis extending parallel to the axis of the lock. An oblique arrangement, that is to say at up to 30° from the parallel direction, is also possible.

It is particularly advantageous for the locking disc to be axially movable on a coaxial extension of the cylinder core. An extension of this kind can in addition be used to operate an electric switch by its free end.

In order to ensure that after the movement of the locking or transmission member or members to the unlocked position the locking disc will move into the range of the locking or transmission members, it is proposed that the locking disc should be loaded by a spring member in the direction away from the cylinder core. In its locking position the locking disc can then lie on a level with the locking member or transmission member.

Furthermore the locking disc should be circular or annular and should be mounted for sliding movement by its central opening on the coaxial extension of the cylinder core. A particularly secure and firm mounting of the locking disc is achieved by fastening it on a bush mounted slidably on the coaxial extension of the cylinder core.

Also, the eccentric should be fastened parallel to the axis of the lock on the cylinder core or on a disc rotationally fixed to the cylinder core. This provides a particularly small construction in the axial direction.

It is ensured that the locking or transmission parts will bear securely against the locking disc by loading the locking member or the transmission member with a spring in the direction of the locking disc. It is also advantageous that the locking or transmission member should be adapted to move from the second nonlocking position to the first locking position in the direction of the axis of the lock.

It is particularly advantageous for a locking or transmission member to be mounted on each of the two sides of the axis of the lock. It is thus also possible to control reliably and uniformly steering-wheel shaft locking devices which have two locking bolts or locking members. In particular, frictional ratchet mechanisms having two cages moving clamp rollers respectively in opposite directions can thus be controlled.

Preferably for each locking or transmission member one eccentric should be provided. The two eccentrics can then lie diametrically opposite one another in relation to the axis of the lock. In addition, the locking disc may have on its edge two diametrically opposite cutouts for the eccentrics.

In order to ensure that, in the key withdrawal position, the locking or transmission members situated in the locking position cannot be moved by manipulation outwards to the non-locking position, the locking or transmission member or members should have, on the side facing the cylinder core, a projection or cutout which engages in a cutout or a projection on the locking disc in the locking position, while in the key withdrawal position this connection prevents a movement of the locking or transmission members to the non-locking position. In this case the edge of the locking disc and/or the edge of the locking or transmission member may have an inclined run-up surface for the engaging connection of these parts.

A particularly compact construction in the direction of the axis of the lock is achieved by fastening on the Locking member or locking bolt a projection against which the eccentric, cam or cam disc comes to bear for the purpose of operating the locking member or locking bolt, and by adapting the locking disc to be displaced, slid or rocked by the projection relatively towards the cylinder core on movement of the cylinder core in the key insertion direction. In addition, this leads to very simple components and to great reliability, as well as to great strength.

BRIEF DESCRIPTION OF THE DRAWING

The invention is described more fully below and illustrated in the drawing, in which:

FIG. 5 is a longitudinal section through the lock after the key has been turned to the "drive" position;

FIG. 6 is a section taken along the line IV—VI in FIG. 5;

FIG. 7, is a longitudinal section through the lock after the key has been turned back to the "halt" position without being withdrawn (ready-to-lock position);

FIG. 8 is a section taken along the line VIII—VIII in FIG. 7;

FIG. 9 is a section taken along the line IX—IX in FIG. 8;

FIG. 14 is a section taken along the line XIV—XIV in FIG. 10;

FIG. 15 is a section taken along the line XV—XV in FIG. 12.

SPECIFIC DESCRIPTION

Figure 4:
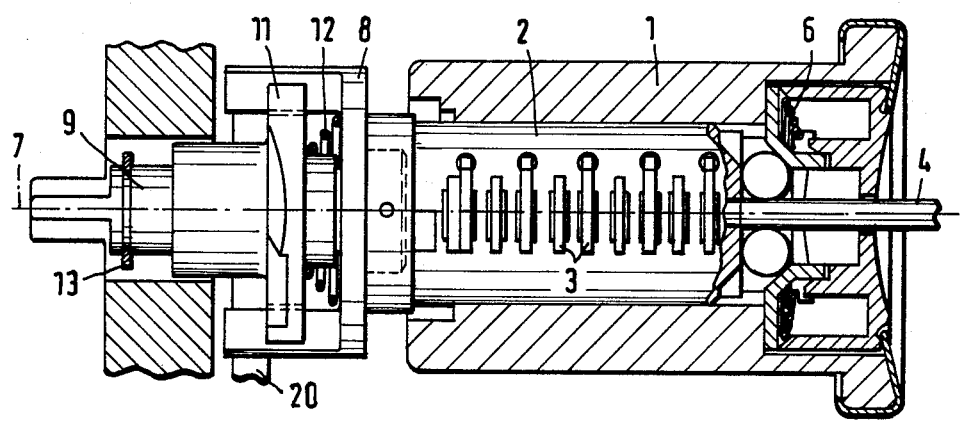
FIG. 4 is a longitudinal section through the lock with the key inserted in the "halt" position, without the key being turned.

A cylinder core 2 is mounted coaxially for rotation in a cylinder casing 1 and is provided with tumbler discs 3 which are adapted to be moved into the non-locking position by a key 4 FIGS. 4, 5 and 7 which can be inserted into the key channel of the cylinder core 2. On insertion of the flat key 4, the latter displaces two rollers 5 which, against the pressure of a spring 6, move the cylinder core 2 a few millimeters in the key insertion direction, in the direction of the axis 7 of the lock.

At the opposite end to that at which the key is inserted, there is fastened on the cylinder core 2 a coaxial disc 8, which carries a coaxial shaft-like extension 9 of the cylinder core, the free end of which extension extends into an electric switch (ignition switch, not shown).

On the extension 9 of the cylinder core a bush 10 is mounted for axial movement, carrying on its periphery a coaxial locking disc 11. Between the locking disc 11 and the disc 8 there lies coaxially a conical compression coil spring 12, which presses the disc 11 away from the disc 8. The path of the bush 10 is bounded on the side remote from the cylinder core by a lock ring 13 mounted on the extension 9.

On diametrically opposite sides, pin-shaped eccentrics 14,15, parallel to the axis 7, project from the edge of the disc 8, their length being equal to or greater than the movement clearance of the bush 10 or of the locking disc 11. In all positions of the disc 11, the eccentrics 14,15 lie in cutouts 16,17 in the edge of the locking disc 11, the width of these cutouts being only slightly greater than the width of the eccentrics. The radial height of these eccentrics is on the other hand about 1 to 3 mm greater than the depth of these cutouts, so that the eccentrics 14,15 project to that extent beyond the cylindrical periphery of the locking disc 11.

On both sides of the shaft-like extension 9 two levers 20,21 bear thereagainst, their axes of rotation 22, 23 extending parallel to the axis 7 of the lock. The levers are plate-shaped, with flat sides being at right angles to the axis 7. The levers may be of the two-armed type, while the ends of the levers remote from the cylinder lock may be locking bolts for the steering-wheel shaft of a motor vehicle. Alternatively, however, the levers 20,21 may also be transmission members which in turn move locking members. These locking members may for example be cylindrical cages containing rollers and forming a frictional ratchet mechanism for a steering-wheel shaft.

The end faces of the levers 20,21 facing one another are pressed by springs 24,25 in the direction of the extension 9 or of the bush 10, and in the locking first position lie against the periphery of the bush 10. In this arrangement the locking disc 11 lies between these levers and the disc 8 or the cylinder core 2.

On each of the flat sides of the levers, facing the cylinder core 2, a projection 26,27 is fastened near the bush 10, each of these pin-shaped projections lying in a groove or cutout provided in the side surface of the locking disc 11 and widening in the direction of the edge of the locking disc. Since these two grooves 28,29 lie approximately tangentially to the periphery of the bush 10, are disposed parallel to one another, open towards opposite sides, and lie roughly parallel to the diameter of the disc on which the eccentrics 14,15 or the cutouts 17,16 lie, the pins or projections 26,27 can pass out of these grooves only when the disc is turned in the key turning direction. On that side of the locking disc on which the grooves are disposed, and which is remote from the cylinder core, respective inclined surfaces are provided as run-up surfaces 30,31 in the region between the edge of the disc and the groove, these surfaces ensuring that the levers 20,21 engage by means of their projections 26,27 in the cutouts 28,29 through the pressure of the springs 24,25, while during this engagement operation the locking disc 11 is moved a few millimeters towards the cylinder core 2 against the pressure of the spring 12.

Instead of a pair of levers 20,21, it is possible to provide only one lever and only one eccentric. Moreover, the number of levers and eccentrics may also be greater than two. Instead of levers, bars may also bear laterally against the extension 9 or the bush 10, and be operated by the locking disc 32. These bars may be moved roughly radially relative to the locking disc 32. Furthermore, the locking disc 32 need not necessarily be circular or annular (for example a cam disc), and may carry the eccentrics; in particular the eccentrics may be formed integrally on the locking disc. The levers or locking or transmission members may also be provided with the cutouts, while instead the locking disc is provided with projections.

Figure 1:
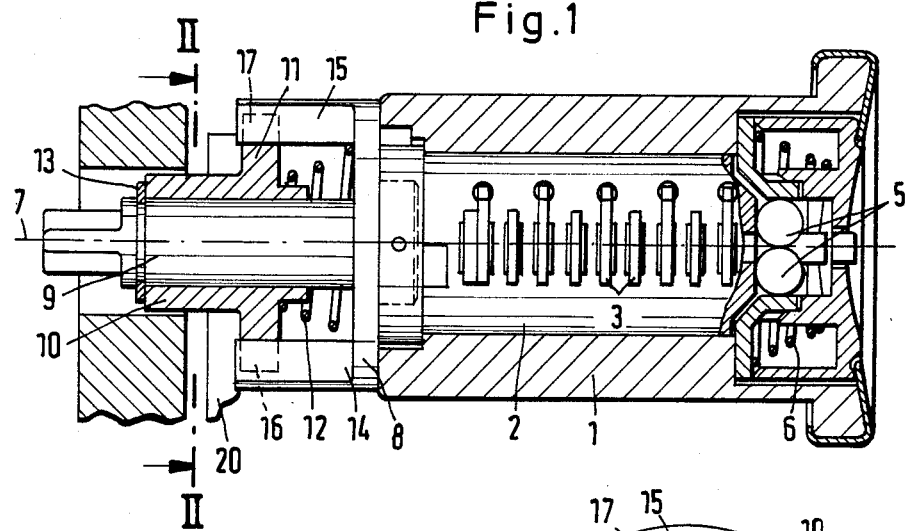
FIG. 1 is a longitudinal section through a first example of embodiment of the lock in the "halt" position after withdrawal of the key.
Figure 3:
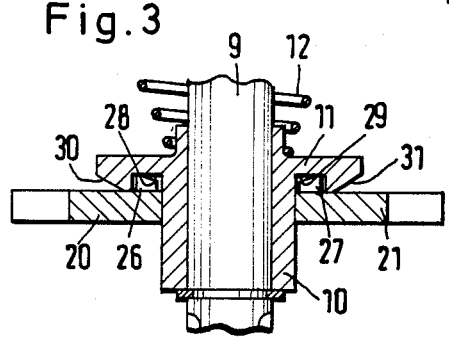
FIG. 3 is a section taken along the line III—III in FIG. 2.
Figure 2:
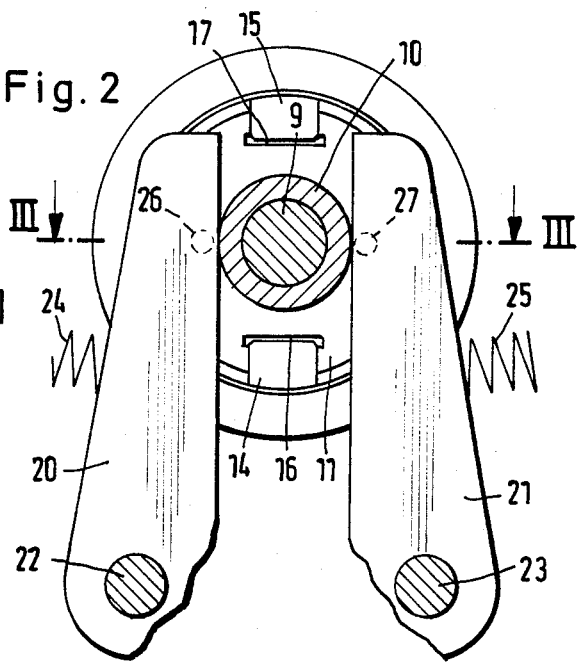
FIG. 2 is a section taken along the line II—II in FIG. 1.

In the "halt" position shown in FIGS. 1 to 3, the key has been withdrawn and the locking members 20, 21 lie on the outside against the bush 10. They thus assume their locking position. The locking disc 11 lies laterally next to the locking members, between them and the cylinder core.

As soon as the key 4 is inserted, it moves the cylinder core into the lock, as shown in FIG. 4, thus also moving the disc 8 and the eccentrics 14,15 away from the key insertion side. The locking disc 11 cannot follow this movement, because it lies against the side surfaces of the locking members 20,21. The spring 12 is thus compressed. The tumbler discs 3 were brought by the key 4 into the position in which they no longer lock the cylinder core.

The cylinder core and thus also the eccentrics 14,15 and the locking disc 11 are now turned by the key 4. The eccentrics consequently move the locking members 20,21 so far in the outward direction that the locking disc 11 can fall into the gap between the locking members through the action of the spring 12, this gap having been made larger, as shown in FIGS. 5 and 6. In this "drive" position the locking members are held by the eccentrics against the pressure of the springs 24,25. If the cylinder core is turned further to the "start" position, the eccentrics or the disc here also hold the locking members in the outward direction.

If the cylinder core is turned back to the "halt" position, the eccentrics come out of engagement and the locking members then bear only against the outer periphery of the locking disc 12, as shown in FIGS. 7 and 8. In this "ready-to-lock position" the locking members will be held until the key has been completely removed. At the moment when the key is completely withdrawn, the cylinder core 2 moves to the starting position through the action of the rollers 5 and the spring 6, the cylinder core carrying with it the bush 10 with the aid of the extension 9 and the lock ring 13, and thus extracting the locking disc 11 from the gap between the locking members. Consequently the locking members can resume the locking position through the pressure of the springs 24 and 25. On this movement towards the bush 10 or the extension 9, the projections 26,27 engage in the cutouts 28,29 in the locking disc.

The example of embodiment shown in FIGS. 10 to 15 differs from the first embodiment, inter alia, in that the locking members are not levers but are longitudinally movable pin-shaped locking bolts 130,35, which lie with two side surfaces against one another, these two side surfaces being disposed radially in relation to the steering-wheel shaft 36 of a motor vehicle. The two locking bolts engage in cutouts 37 in a bush 38 disposed on the steering-wheel shaft. In the two side faces of the locking bolts are provided cutouts 39,40, which register with one another to form a slot through which passes an extension 9 of the cylinder core. This extension ends in a switch (not shown) of the lock. The two locking bolts 30,35 are loaded by springs 41,42 in the direction of the steering-wheel shaft. The size of the cutouts 37 and the arrangement of the two locking bolts are such that after extraction of the key at least one of the two locking bolts will fall into one of the cutouts in the bush 38. The exact mode of operation is described in German patent document (Application) 32 13 719.

At the ends of the locking bolts 130,35 remote from the steering-wheel shaft 36, a pin 131 parallel to the axis of the lock projects in each case on the side facing the cylinder core. The two pins form projections of the locking bolts and lie against the outer edge of a cam disc 32, which may also be an eccentric or cam. The cam disc 32 is fastened on the shaftlike extension 9 of the cylinder core 2 in such a manner as to rotate therewith and to be axially immovable relative to the extension, so that on rotation of the cylinder core the cam disc 32 is also rotated and the locking bolts 130,35 are lifted out of the cutouts 37 against the pressure of the springs 41,42.

The cam disc 32 is, over about three-quarters of its periphery, circular with a constant radius in relation to the axis of the lock and the extension. Over the remaining quarter of its periphery the cam disc 32 has a cutout 32a, the radius of which amounts to only about half of the remainder of the radius, and in which the pins 131 engage in the "halt" position of the lock on withdrawal of the key (FIG. 10).

Between the cam disc 32 and the cylinder core 2 a locking disc 11a is mounted for axial movement on the extension 9, this disc being circular and being pressed against the cam disc 32 by a conical coil compression spring 33 lying between the locking disc and the cylinder core. In the "halt" and "drive" positions of the lock the locking disc 11a lies parallel against the side surface of the cam disc 32, so that the two discs 11a and 32 lie at right angles and axially relative to the axis of the lock or cylinder core extension. In this position of the locking disc 11a the latter lies within the range of movement of the pins 31, so that in this position of the locking disc the locking bolts 130,35 cannot drop into the cutouts 37—see FIG. 13. For this to occur it is necessary for the pins 131 to project laterally from the locking bolts to such an extent as to extend at least beyond the cam disc 32 and the locking disc 11a. Since in the example of embodiment the cam disc lies close against the locking bolts, the length of the pins 131 is greater than or equal to the thickness of the two discs 11a and 32 taken together.

Figure 10:
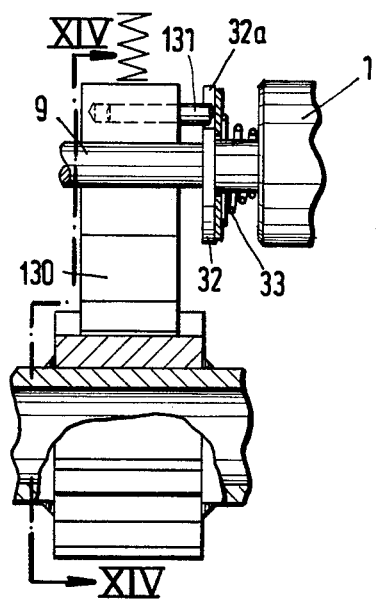
FIG. 10 is a longitudinal section (along line X—X of FIG. 14 through a second embodiment of the invention in the "halt" position after withdrawal of the key.
Figure 11:
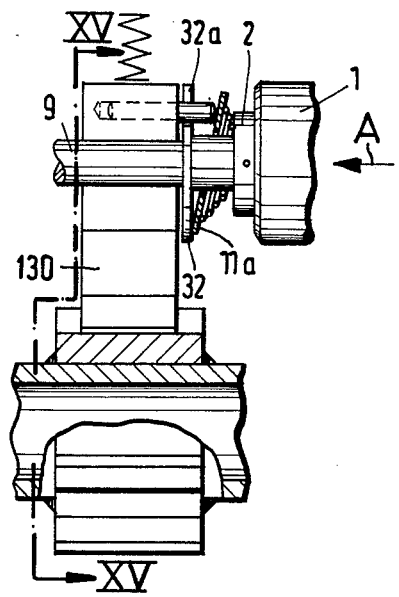
FIG. 11 is a longitudinal section in the "halt" position after insertion of the key.
Figure 12:
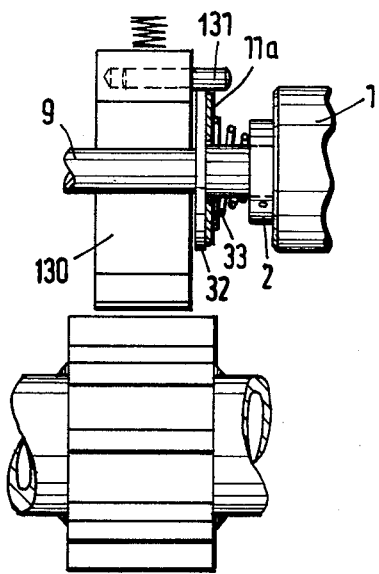
FIG. 12 is a longitudinal section along line (XII—XII) in the "drive" position.
Figure 13:
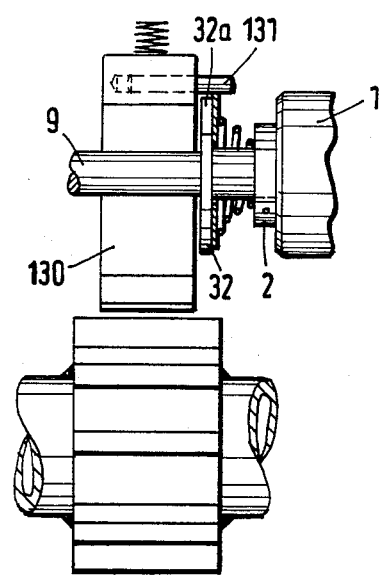
FIG. 13 is a longitudinal section after the key has been turned from the "drive" position to the "halt" position, without the key being withdrawn.

If in the "halt" position shown in FIG. 10 the key (not shown) is inserted in the direction of the arrow A (FIG. 11), in this cylinder lock having an axially movable cylinder core 2, the cylinder core is moved in the direction A towards the locking bolts. Since in the "halt" on the locking bolts are in the locking position, the pins 131 lie in the cutout 32a in the cam disc 32 and during the axial movement prevent the movement of the locking disc 11a together with the cam disc 32. On the contrary, the circular locking disc 11a is lifted off the cam disc 32 by the pins 31 against the pressure of the spring 33 and is tilted by them (FIG. 11). Alternatively, the locking disc 11a may however be moved by the pins 131 parallel on the extension 9 of the cylinder core, instead of being tilted, if the locking disc has suitable parallel guidance in relation to the extension 9.

If the cylinder core 2 is now turned by the key from the "halt" position to the "drive" position (FIG. 12), the pins 131 are lifted by the cam disc 32 and thus the locking bolts 130,35 are brought into the unlocked position. Since the radius of the locking disc 11a is slightly smaller than the radius of the cam disc 32 outside the region of the cutout 32a, in the "drive" position shown in FIG. 12, the disc 11a can spring back or engage, through the action of the compression spring 33, into the position in which it bears against the cam disc. In this position the pins 131 are further from the axis of the lock or extension than the radius of the locking disc 11a.

If the cylinder core 2 is turned back by the key from the "drive" position to the "halt" position (ready-to-lock position, FIG. 13), the cutout 32a in the cam disc is now within the range of the pins. The pins 131 would now be pushed into the cutout 32a by the springs 41,42 if the locking disc did not prevent them from doing so. The pins 131 now lie against the outer edge of the locking disc 11a, which in this position takes over the function of the cam disc in accordance with the "drive" position. If the key is now withdrawn, this leads to a movement of the cylinder core in the direction opposite to the arrow A. Together with the cylinder core, the extension 9 and the cam disc 32 are pulled back. Thus the locking disc 11a comes out of the range of movement of the pins 131, so that the latter can fall into the cutout 32a (FIG. 10). The length of the pins 31 is selected so that they always remain in the range of axial movement of the cam disc 32, but that their ends remain outside the plane of the locking disc 11a in the pulled-back position of the cylinder core.

I claim:
1. A cylinder lock for an automotive vehicle having a steering wheel, comprising;
   a cylinder casing;
   a cylinder core received in said casing and provided with tumblers operable upon insertion of a key into one end of said core to permit rotation of said core from a locked position into an unlocked position relative to said casing by said key;
   means between said core and said casing for axially shifting said core in said casing in opposite axial direction upon insertion of said key into said core and withdrawal of said key from said core;
   a cam rotatable with said core and disposed at an opposite end thereof, said cam lying in a plane perpendicular to an axis of rotation of said core;
   a bolt movable in a direction transverse to said axis and operatively engageable with said steering wheel to lock said steering wheel against rotation in the locked position of said core, said bolt having a pin displaceable by said cam and extending generally parallel to said axis whereby rotation of said core between said locked and unlocked positions rotates said cam to displace said pin and retract said bolt to release said steering wheel; and
   a circular locking disc disposed proximal to said cam at said opposite end of said core and axially shiftable by said pin relative to said core upon an axial movement of said core in a key insertion direction relative to said casing, said disc retaining said pin against return of said bolt into engagement with said steering wheel until said key is extracted from said core and said core is thereby moved axially opposite to said key insertion direction.

2. The cylinder lock defined in claim 1, further comprising a conical coil compression spring disposed upon an axial extension of said core at said opposite end and yieldably urging said disc in the direction said cam and away from said casing.

3. The cylinder lock defined in claim 2 wherein said cam is mounted on said extension.

4. The cylinder lock defined in claim 3 wherein said cam forms a bearing surface for said disc.

5. The cylinder lock defined in claim 1 wherein said cam is formed with an outwardly open recess along its periphery adapted to receive said pin, said disc having a diameter greater than the diameter of said disc.

6. The cylinder lock defined in claim 1 wherein a second bolt is provided mirror symmetrical with the first mentioned bolt and is formed with an axial pin engageable by said cam and adapted to be held by said disc so that said bolts are retracted from engagement with said steering wheel.

7. The cylinder lock defined in claim 6 wherein said bolts have mutually registering recesses and said core has an extension at said opposite end carrying said cam and said disc and traversing said recesses.

8. The cylinder lock defined in claim 7 wherein said steering wheel is provided with a collar formed with angularly spaced indentations each of which is dimensioned to receive both of said bolts, said extension being provided with a conical compression spring biasing said disc axially away from said casing and toward said cam, said cam having a bearing surface against which said disc can engage.

* * * * *